(12) United States Patent
Sanderson (10) Patent No.: US 6,871,716 B2
(45) Date of Patent: Mar. 29, 2005

(54) PIVOT LOCK

(75) Inventor: David L. Sanderson, Kirkland, WA (US)

(73) Assignee: PACCAR Inc, Bellevue, WA (US)

(*) Notice: Subject to any disclaimer, the term of this patent is extended or adjusted under 35 U.S.C. 154(b) by 90 days.

(21) Appl. No.: 10/392,727

(22) Filed: Mar. 18, 2003

(65) Prior Publication Data
US 2004/0182617 A1 Sep. 23, 2004

(51) Int. Cl.⁷ .............................................. B62D 25/10
(52) U.S. Cl. .................................................. 180/69.21
(58) Field of Search .......................... 180/69.2, 69.21, 180/89.13, 89.14, 89.16–89.19; 16/319, 343, 346, 349, 374, 377

(56) References Cited

U.S. PATENT DOCUMENTS

| | | | |
|---|---|---|---|
| 179,424 A | | 7/1876 | Pfeifer |
| 1,187,040 A | | 6/1916 | Capps |
| 1,225,322 A | | 5/1917 | Forth |
| 1,580,289 A | | 4/1926 | Cummings |
| 1,918,040 A | * | 7/1933 | Kassick ........................ 16/346 |
| 1,942,665 A | | 1/1934 | Schmitt |
| 2,031,759 A | * | 2/1936 | Casper ........................ 108/81 |
| 2,835,522 A | * | 5/1958 | Serto ............................ 16/390 |
| 2,903,149 A | | 9/1959 | Turner |
| 3,183,927 A | | 5/1965 | Weese et al. |
| 3,556,240 A | | 1/1971 | Hartman |
| 3,941,415 A | | 3/1976 | Cooper |
| 4,191,271 A | * | 3/1980 | Fox et al. .................... 180/328 |
| 4,359,119 A | | 11/1982 | Kammerman |
| 4,915,441 A | | 4/1990 | Nitzke |
| 4,991,675 A | * | 2/1991 | Tosconi et al. ........... 180/69.21 |
| 5,022,118 A | | 6/1991 | Wan-Li |
| 5,749,425 A | * | 5/1998 | Cudden ...................... 180/69.2 |
| 5,791,428 A | | 8/1998 | Noll et al. |
| 5,975,228 A | | 11/1999 | Parfitt |
| 6,003,204 A | | 12/1999 | Roach et al. |
| 6,394,211 B1 | | 5/2002 | Palenchar et al. |
| 6,637,531 B2 | | 10/2003 | Palenchar et al. |
| 6,712,423 B2 | * | 3/2004 | Lehmann .................. 296/180.1 |

FOREIGN PATENT DOCUMENTS

JP          1-197184      * 8/1989

* cited by examiner

Primary Examiner—Bryan Fischmann
(74) Attorney, Agent, or Firm—Christensen O'Connor Johnson Kindness PLLC (57) ABSTRACT

A pivot lock (100) extending between a first location (112) on a vehicle (102) and a second location (114) on a panel (104) wherein the pivot lock is adapted to selectively lock the panel in an open position is provided. The pivot lock includes a linkage assembly (121) having a first link (108) coupled to a second link (110) at a third location (120). The first link is rotatable from an unlocked position, wherein the third location is located on a first side of a line (144) intersecting the first and second locations, to a locked position, wherein the third location is located on a second side of the line. A release mechanism (128) is movable such that the release mechanism engages the linkage assembly to remove the first link from the locked position, thereby permitting the panel to reciprocate into the closed position.

31 Claims, 7 Drawing Sheets

PIVOT LOCK

FIELD OF THE INVENTION

The present invention relates generally to pivot locks and, more particularly, to pivot locks adapted to lock a panel of a vehicle in an open position.

BACKGROUND OF THE INVENTION

The engine compartments of most vehicles are provided with hoods which serve to generally enclose the engine compartment. The hoods are mounted to the vehicle frame and pivotal about a hinge assembly between open and closed positions. In the closed position, the hood generally encloses the engine and other vehicle components during vehicle operation. In the open position, the hood exposes the engine and other vehicle components to allow easy access for maintenance and/or repair operations.

In some previously developed designs, the hood is maintained in the open position by bracing the hood in the open position with a rod. Typically, the rod is pivotally connected to the frame or hood of the vehicle and is swung outward from a stowed position to extend between the hood and the frame of the vehicle to brace open the hood. Although this method is effective, it is not without its problems. For instance, the user must lift the hood with a single hand while manipulating the rod with the other hand to brace open the hood, an awkward and sometimes injury prone process. Further, the rod may be bumped and dislodged from its position, thereby permitting the weight of the hood to come crashing down, possibly injuring the user or equipment of the truck.

SUMMARY OF THE INVENTION

A pivot lock adapted to extend between a vehicle and a panel of the vehicle, the panel reciprocal between an open position and a closed position, wherein the pivot lock is adapted to selectively lock the panel in the open position is provided. The pivot lock includes a linkage assembly adapted to extend between and pivotally couple to a first location on the vehicle and a second location on the panel. The linkage assembly includes a first link and a second link pivotally coupled to the first link at a third location. When the panel is in the open position, the first and second links are configured in a locked position, wherein rotation of each of the first and second links in at least one direction is impeded to thereby restrain the panel from reciprocating to the closed position. The pivot lock further includes a release mechanism coupled to the linkage assembly, the release mechanism selectively movable to a release position. When the release mechanism is in the release position, the release mechanism applies a force to the linkage assembly to rotate the first and second links relative to one another to an unlocked position, wherein the panel is permitted to reciprocate into the closed position. The pivot lock still further includes a cam surface disposed on the linkage assembly, wherein when the panel is reciprocated between the open and closed positions, the cam surface engages the release mechanism, selectively moving the release mechanism from the release position to a stowed position.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
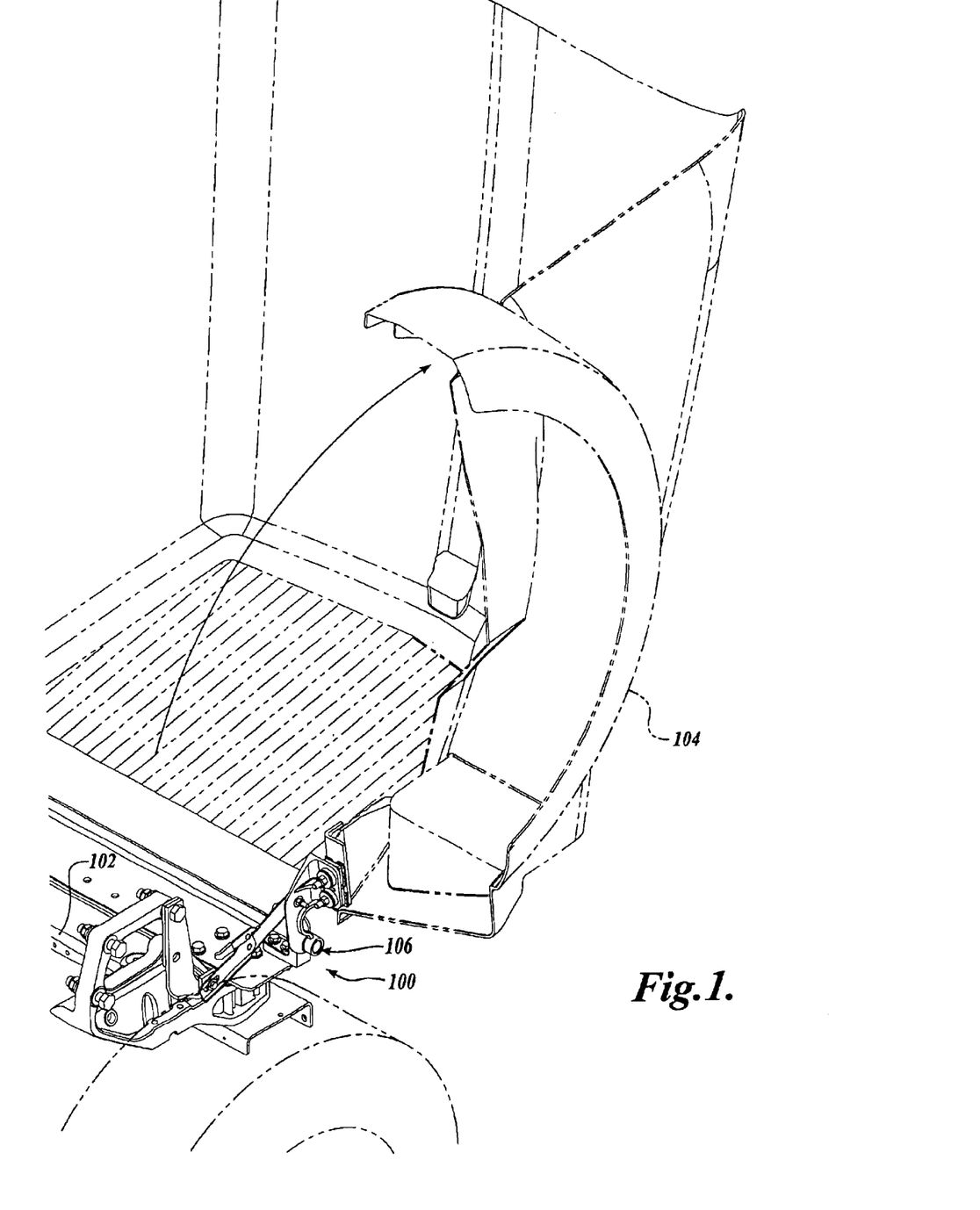
FIG. 1 is a partial perspective view of a portion of a front section of a vehicle depicting a portion of a hood, a portion of the vehicle's frame, a wheel (shown in phantom), and a hinge assembly coupling the hood to the frame, wherein one embodiment of a pivot lock formed in accordance with the present invention is shown extending between the frame and the hood, the pivot lock shown in a locked position.

FIGS. 1–9 illustrate a pivot lock 100 formed in accordance with one embodiment of the present invention. Referring to FIG. 1, generally described, the pivot lock 100 extends between a frame 102 and a hood 104 of a vehicle. The hood 104 is reciprocal between an open position, such as shown in FIG. 1, and a closed position (not shown) about a hinge assembly 106. The pivot lock 100 is adapted to selectively lock the hood 104 in the open position to impede unintentional closing of the hood 104, thus protecting a user from injury.

Although the illustrated embodiment of the present invention is described as implemented in conjunction with a hood of a vehicle, those skilled in the relevant art will appreciate that the disclosed pivot lock 100 and the disclosed embodiment are illustrative in nature and should not be construed as limited to application with a hood. It should therefore be apparent that the pivot lock 100 has wide application, and may be used in any situation where impeding the reciprocation of a panel of a vehicle is desirable, the term "panel"

used for the purpose of this detailed description to generally describe and encompass any reciprocal portion of a vehicle such as a trunk lid, door, enclosure, housing, or other such portion of a vehicle.

Figure 2:
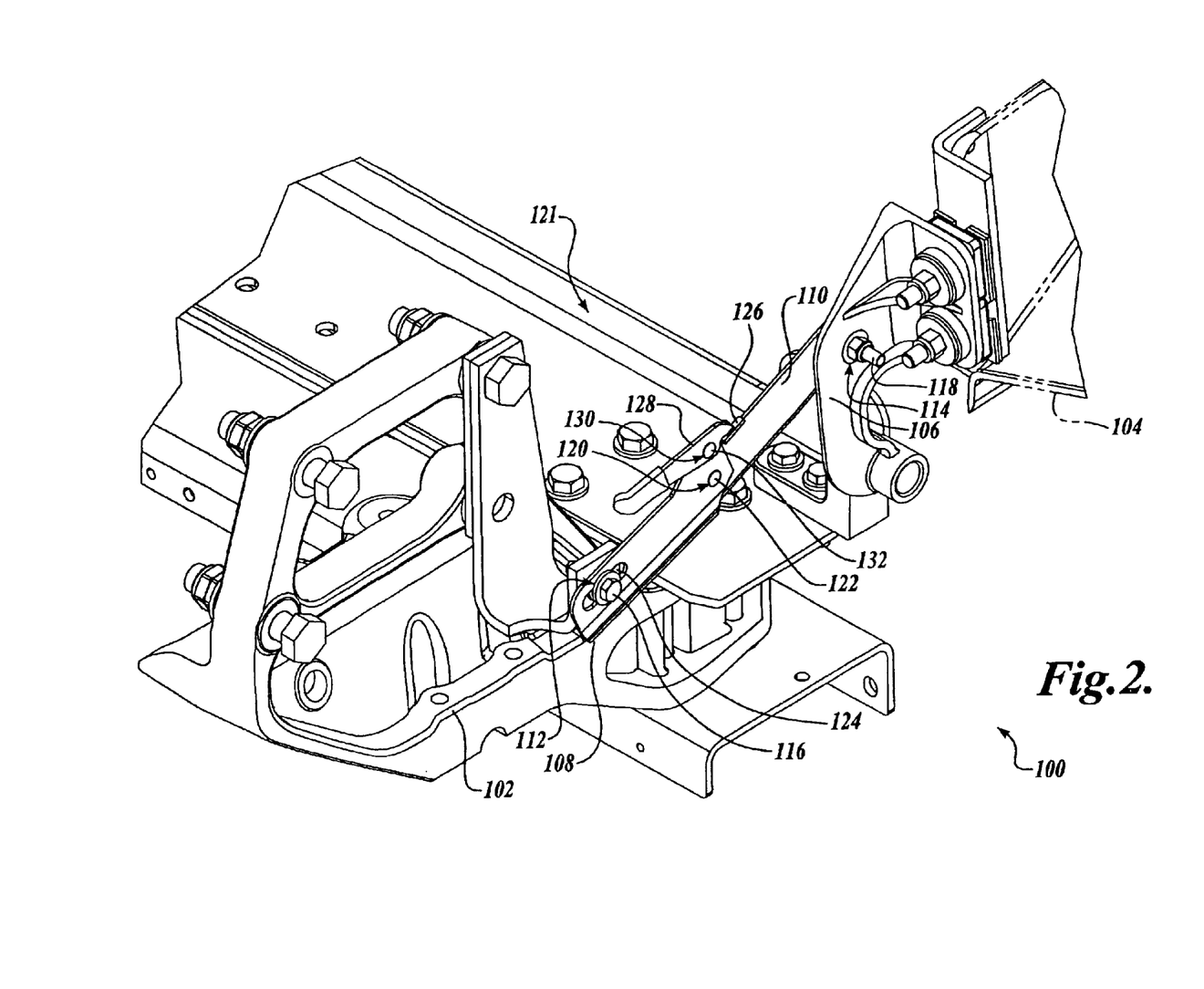
FIG. 2 is a partial perspective view of the pivot lock depicted in FIG. 1 and a portion of the environment surrounding the pivot lock.
Figure 3:
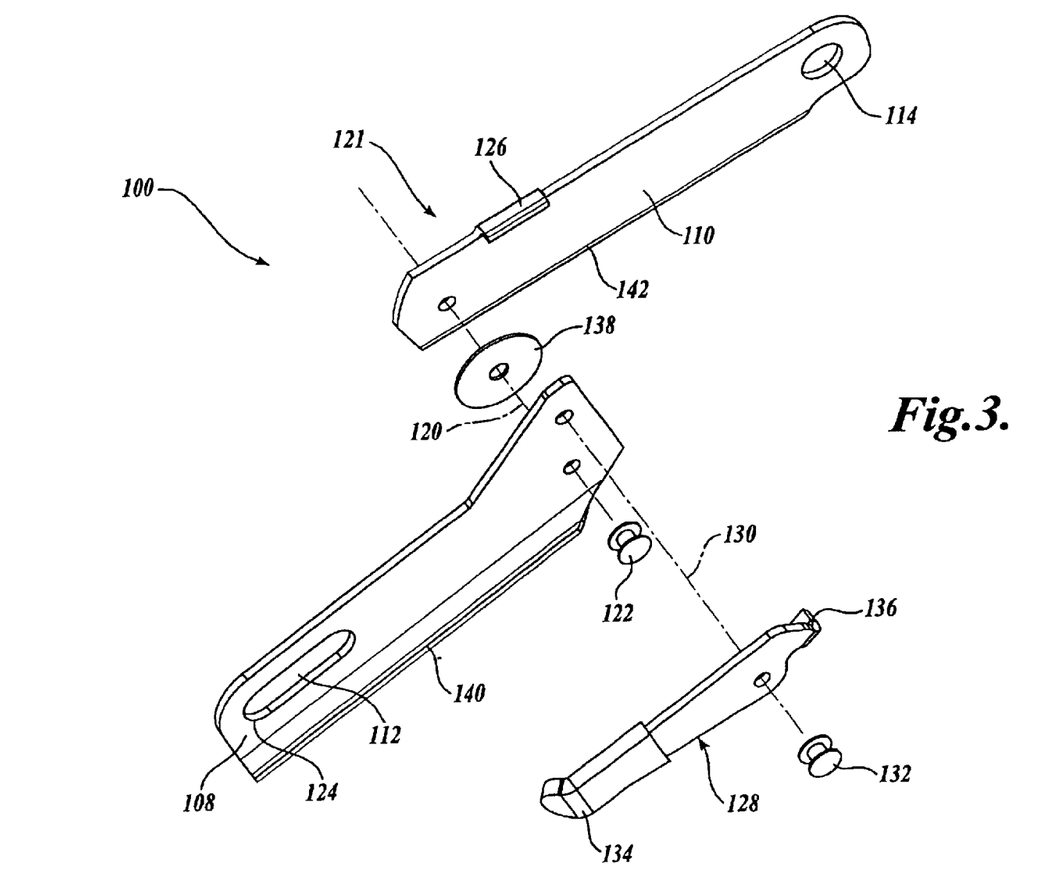
FIG. 3 is an exploded perspective view of the pivot lock depicted in FIG. 1.

Referring to FIGS. 1 and 2, the pivot lock 100 is shown in a locked position, thus the hood 104 is impeded from reciprocating from the open position shown to a closed position (not shown). Referring now to FIGS. 2 and 3, the pivot lock 100 includes a linkage assembly 121 having a first link 108 pivotally coupled to the frame 102 at a first location 112 by a well known fastener, such as a bolt 116. The linkage assembly 121 further includes a second link 110 pivotally coupled to the hinge assembly 106 of the hood 104 at a second location 114 by a well known fastener, such as a bolt 118. The first and second links 108 and 110 are pivotally coupled to one another at a third location 120 by a well known fastener, such as a pivot pin 122. A washer 138 is disposed upon the pivot pin 122 between the first and second links 108 and 110 to facilitate the rotating of the first and second links 108 and 110 relative to one another.

The first link 108 includes a slot 124, the slot sized to pivotally and slidingly receive the bolt 116. The slot 124 permits the first link 108 to longitudinally move along its length relative to the bolt 116, while also permitting the first link 108 to rotate about the bolt 116. In the illustrated embodiment, the slot 124 provides some play during operation of the pivot lock 100 such that the pivot lock 100 may satisfactorily operate despite some misalignment between the components of the pivot lock 100 and/or frame 102, hinge assembly 106, or hood 104 of the vehicle. A structural web 140 is formed along one of the longitudinal edges of the first link 108 by bending outward a planar surface of the first link 108 along a longitudinal edge. The structural web 140 enhances the ability of the first link 108 to resist bending moments oriented perpendicular to the planar surface of the first link 108.

Figure 4:
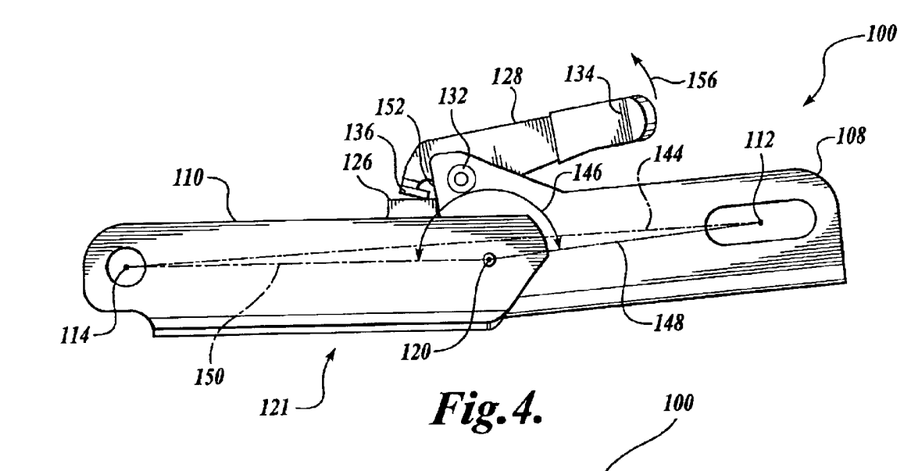
FIG. 4 is an elevation view of the pivot lock depicted in FIG. 1, wherein the pivot lock is shown in a locked position.

The second link 110 includes a stop 126 which extends perpendicularly outward from a planar surface of the second link 110. The stop 126 is sized and shaped to engage the first link 108 when the pivot lock 100 is in a locked position, such as is shown in FIG. 4, as will be described in further detail below. A structural web 142 is formed along one of the longitudinal edges of the second link 110 by bending outward the planar surface of the second link 110 along the longitudinal edge. The structural web 142 enhances the ability of the second link 110 to resist bending moments oriented perpendicular to the planar surface of the second link 110.

Coupled to the first link 108 is a release mechanism 128. The release mechanism 128 of the illustrated embodiment is a lever, pivotally coupled to the first link 108 between opposite distal ends at a fourth location 130 by a well known fastener, such as a pivot pin 132. The release mechanism 128 includes a handle 134, mounted at one of the distal ends, and an engagement tab 136, mounted at the opposite distal end. Rotation of the release mechanism 128 in a clockwise direction causes the engagement tab 136 of the release mechanism 128 to bear down upon the stop 126 of the second link 110 to release the linkage assembly 121 from the locked position, as will be described in further detail below.

In light of the above detailed description of the structure of the pivot lock 100, the operation of the pivot lock 100 will now be described. Referring to FIG. 4, the pivot lock 100 is shown in a locked position, wherein rotation of the first link 108 relative to the second link 110 in a counterclockwise manner is impeded. In the illustrated embodiment, the linkage assembly 121 is placed in the locked position by placing the linkage assembly 121 in an over center position, although it should be apparent to those skilled in the art that the linkage assembly 121 may be placed in a locked position by means other than placing the linkage assembly 121 in an over center configuration. For example, one suitable means of placing the linkage assembly in a locked configuration without placing the linkage assembly 121 in an over center position is described in U.S. Pat. No. 1,580,289, the disclosure of which is hereby incorporated by reference.

In the over center position of FIG. 4, the third location 120 is located on a first side of an imaginary line 144 intersecting the first and second locations 112 and 114. Configured as such, the first, second and third locations 112, 114, and 120 are not linearly aligned. More specifically, a separation angle 146 is formed between an imaginary line 148 intersecting the first and third locations 112 and 120 and an imaginary line 150 intersecting the second and third locations 114 and 120, the separation angle 146 being less than 180 degrees. Thus, any force applied longitudinally along the length of the linkage assembly 121, such as a force tending to close the hood, would tend to decrease the separation angle 146 by rotating the first link 108 in a counterclockwise manner and the second link 110 in a clockwise manner. However, rotation of the first and second links 108 and 110 in the manner described is impeded by an edge 152 of the first link 108 engaging the stop 126 of the second link 110, thereby impeding further rotation of the links 108 and 110.

Figure 5:
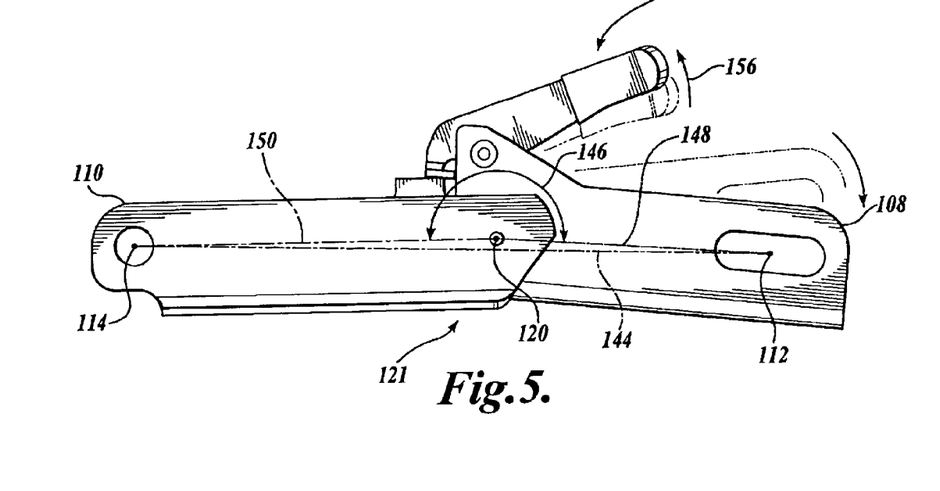
FIG. 5 is an elevation view of the pivot lock depicted in FIG. 1, wherein the pivot lock is shown in an unlocked position and a release mechanism is depicted in a release position.

Referring now to FIGS. 4 and 5, the configuring of the pivot lock 100 from the over center and locked position shown in FIG. 4 to the unlocked position shown in FIG. 5 will now be described. The reconfiguring of the pivot lock 100 from the locked to the unlocked position is made possible by the release mechanism 128 pivotally coupled to the first link 108. In operation, a user grasps the handle 134 of the release mechanism 128, placing a force upon the handle 134 in the direction of the arrow indicated by reference numeral 156. This causes the release mechanism 128 to pivot about pivot pin 132 in a counterclockwise manner. This in turn causes the engagement tab 136 of the release mechanism 128 to engage the stop 126 of the second link 110. Thus, the user applied force upon the handle 134 causes the first link 108 to rotate clockwise about the third location 120 and the second link 110 to rotate counterclockwise about the third location 120 to the unlocked configuration of the linkage assembly 121 shown in FIG. 5. Further, the described rotation causes the separation angle 146 to increase to a non-over center value, i.e., an angle exceeding 180 degrees.

Referring to FIG. 5, the pivot lock 100 is shown in an unlocked position. When in the unlocked position, the linkage assembly 121 is removed from the over center position. In the unlocked position, the third location 120 is located on a second side opposite the first side of the imaginary line 144 intersecting the first and second locations 112 and 114. Configured as such, the first, second and third locations 112, 114, and 120 are not linearly aligned. More specifically, the separation angle 146 formed between imaginary lines 148 and imaginary line 150 has increased to a value exceeding 180 degrees. In this configuration, any force applied longitudinally along the length of the linkage assembly 121, such as a force tending to close the hood, would increase the separation angle 146 by rotating the first link 108 in a clockwise manner and the second link 110 in a counterclockwise manner, thus permitting the hood to reciprocate into the closed position.

Figure 6:
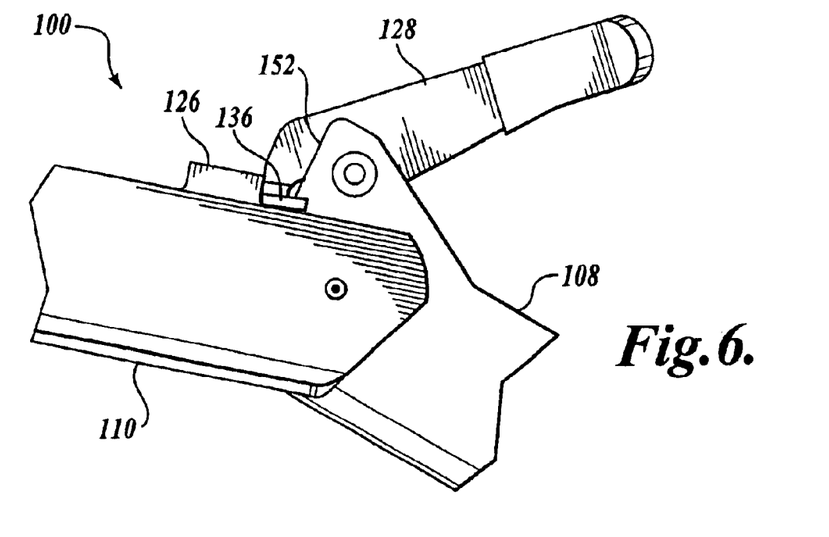
FIG. 6 is an elevation view of the pivot lock depicted in FIG. 1, wherein the pivot lock is shown in an unlocked position with a release mechanism depicted in a limit position.

Referring to FIG. 6, the pivot lock 100 is shown in an unlocked position with the release mechanism 128 configured in a limit position. In the limit position, the engagement tab 136 of the release mechanism 128 becomes pinched, due to gravity, between the stop 126 of the second link 110 and the edge 152 of the first link 108. The pinching of the engagement tab 136 between the stop 126 and the edge 152 of the first link 108 limits/impedes the pivot lock 100 from returning to the locked, over center position depicted in FIG. 4. Thus, a user can leave the pivot lock 100 and go to an alternate location, such as to the front of the hood, to begin closing the hood, without the pivot lock 100 unintentionally returning to the locked position of FIG. 4.

Figure 7:
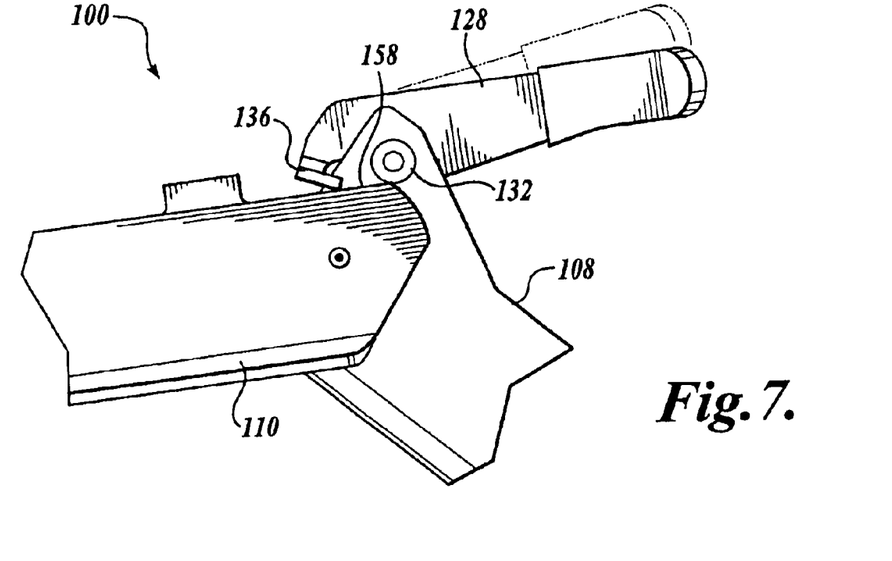
FIG. 7 is an elevation view of the pivot lock depicted in FIG. 1, wherein the pivot lock is shown as the pivot lock transitions from the unlocked position of FIG. 6 to a partially stowed position, wherein a cam on a first link of the pivot lock engages the release mechanism coupled to the pivot lock, thereby rotating the release handle from the release position to a non-release position.
Figure 8:
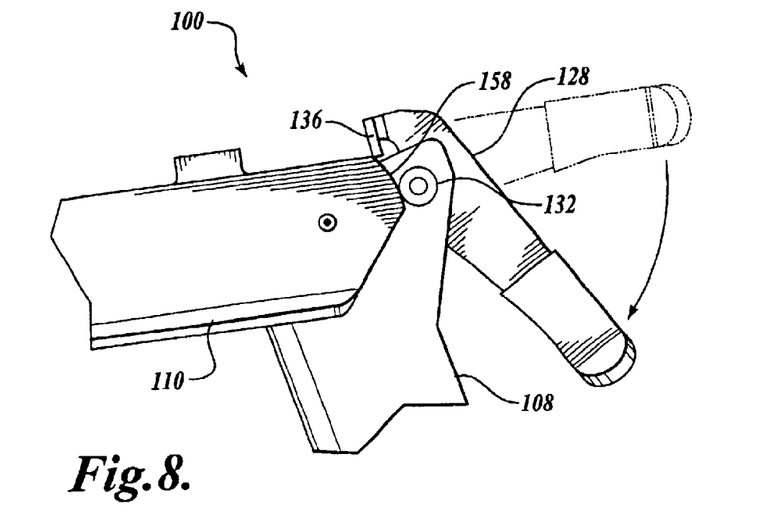
FIG. 8 is an elevation view of the pivot lock depicted in FIG. 1, wherein the pivot lock is shown as the pivot lock transitions from the partially stowed position of FIG. 7 to the stowed position of FIG. 9, wherein the cam on the first link of the pivot lock continues to engage the release mechanism of the pivot lock, thereby rotating the release handle from the non-release position to a stowed position.
Figure 9:
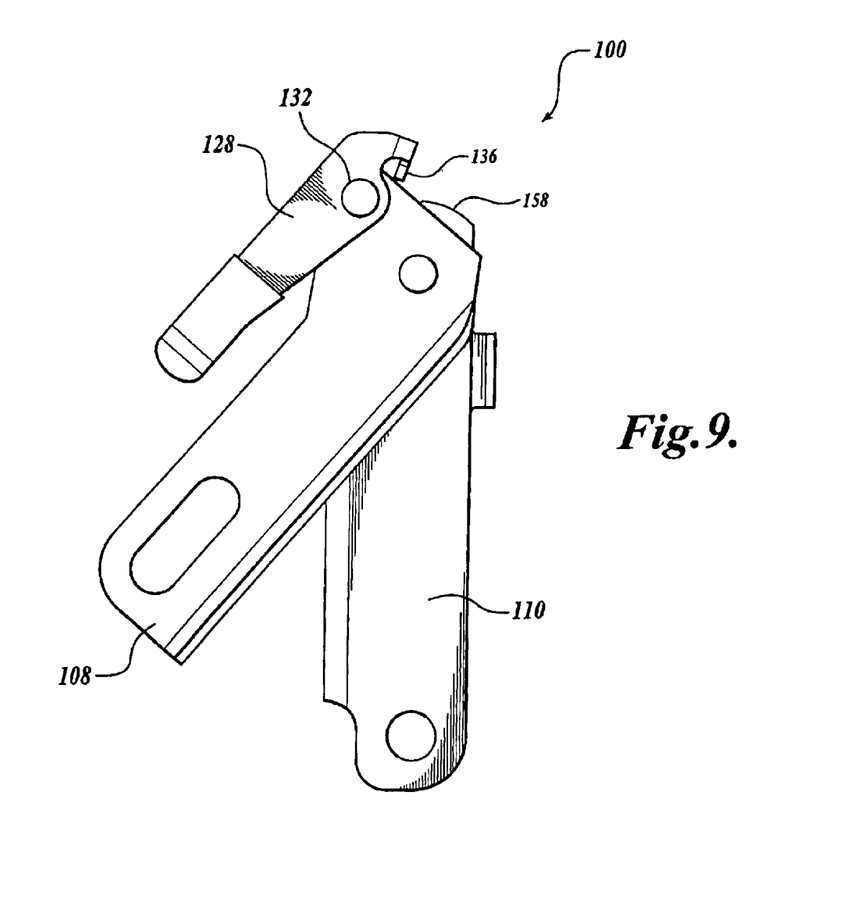
FIG. 9 is an elevation view of the pivot lock depicted in FIG. 1, wherein the pivot lock and the release mechanism are both shown in the stowed position.

Referring to FIGS. 7–9, as the first link 108 is rotated further clockwise and the second link 110 is rotated further counterclockwise, the engagement tab 136 of the release mechanism 128 engages the second link 110. More specifically, the engagement tab 136 engages a cam 158 of the second link 110. Engagement of the engagement tab 136 with the cam 158 causes the release mechanism to rotate clockwise about pivot pin 132, configuring the release mechanism 128 from the release position shown in FIG. 5, wherein the length of the release mechanism 128 is substantially parallel with the second link 110, to the stowed position shown in FIG. 9, wherein the length of the release mechanism 128 is substantially parallel with the first link 108. Thus the cam 158 automatically configures the release mechanism 128 in a controlled manner from the release position to the stowed position, thereby impeding the release mechanism 128 from becoming jammed during the operation of the pivot lock 100 and ensuring that the release mechanism 128 is positioned in a selected stowed position.

Referring to FIGS. 4–9, when the release mechanism 128 is in the stowed position and the pivot lock 100 is rotated from the stowed position of FIG. 9 to the locked position of FIG. 4, such as would occur during the opening of the hood, the engagement tab 136 of the release mechanism 128 passes over the top of the stop 126. Thus, the pivot lock 100 is permitted to configure into the locked position without interference between the engagement tab 136 and the stop 126.

Figure 10:
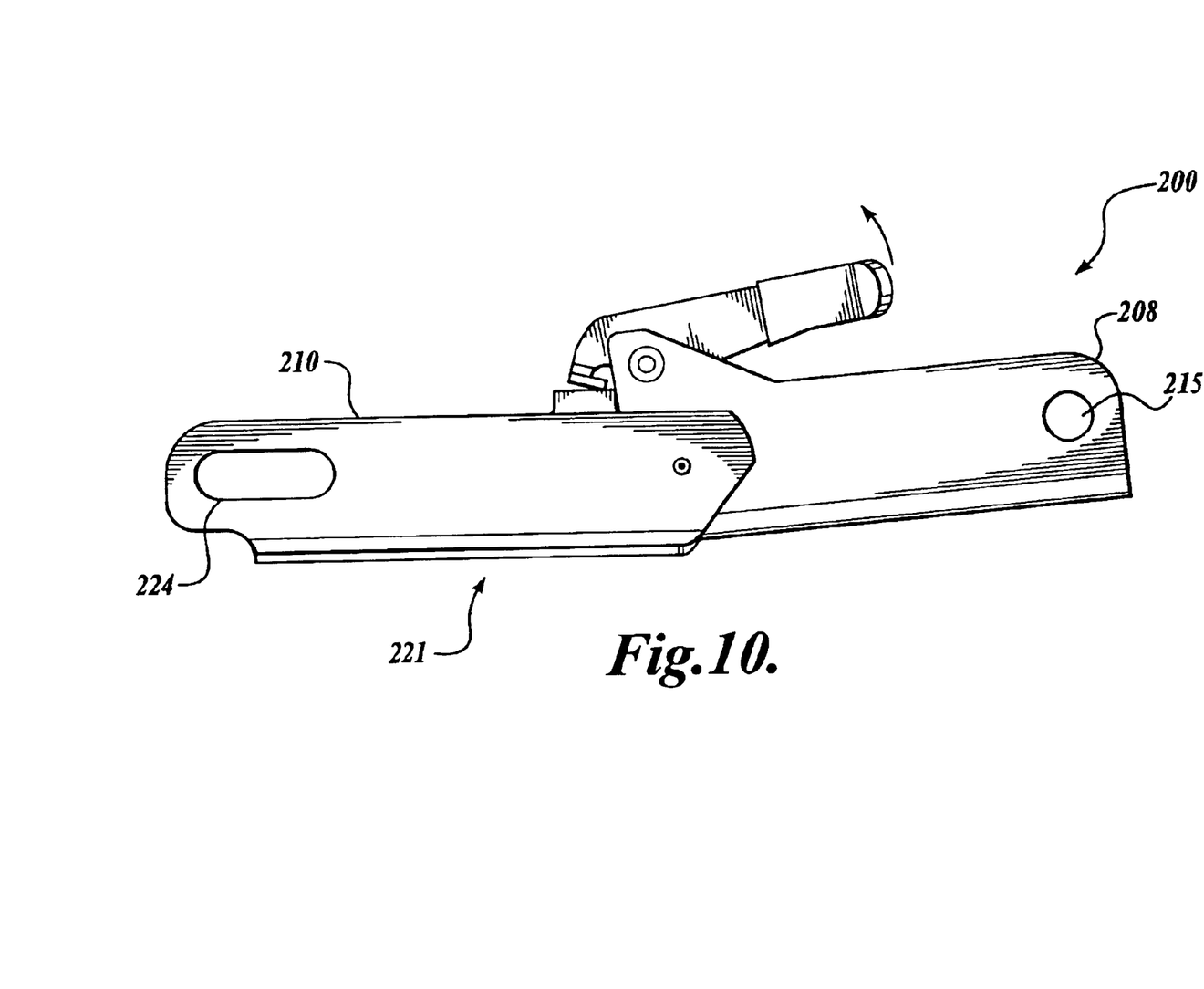
FIG. 10 is an elevation view of an alternate embodiment of a pivot lock formed in accordance with the present invention, wherein the linkage assembly is pivotally and slidingly coupled to a panel.

Referring to FIG. 10, an alternate embodiment of a pivot lock 200 formed in accordance with the present invention is shown. The alternate embodiment of FIG. 10 is substantially similar to the pivot lock 100 of FIGS. 1–9 with the exception that the slot 124 on the first link 108 of the embodiment of FIGS. 1–9 has been swapped with the hole on the second link 110 so that the pivot lock 200 is pivotally and slidingly coupled to the panel instead of the vehicle as illustrated and described in the above embodiment. Moreover, the linkage assembly 221 of FIG. 10 includes a first link 208 adapted to be pivotally coupled to a frame of the vehicle by a bolt interfacing with a hole 215 in the first link 208. The linkage assembly 221 further includes a second link 210 which includes a slot 224 which permits the linkage assembly 221 to be pivotally and slidingly coupled to a panel.

While the preferred embodiment of the invention has been illustrated and described, it will be appreciated that various changes can be made therein without departing from the spirit and scope of the invention.

What is claimed is:

1. A pivot lock adapted to extend between a vehicle and a panel of the vehicle, the panel reciprocal between an open position and a closed position, wherein the pivot lock is adapted to selectively lock the panel in the open position, the pivot lock comprising:
    (a) a linkage assembly pivotally coupled to a first location on the vehicle and a second location on the panel, the linkage assembly including;
        (i) a first link; and
        (ii) a second link pivotally coupled to the first link at a third location, the first and second links configurable in a locked position, wherein rotation of the first and second links relative to one another is impeded to restrain the panel from reciprocating to the closed position;
    (b) a release mechanism coupled to the linkage assembly, the release mechanism selectively movable to a release position, wherein the release mechanism applies a force to the linkage assembly to rotate the first and second links relative to one another to an unlocked position, wherein the panel is permitted to reciprocate to the closed position; and
    (c) a cam surface disposed on the linkage assembly, wherein when the panel is reciprocated from the open position to the closed position, the cam surface engages the release mechanism, selectively moving the release mechanism from the release position to a stowed position.

2. The pivot lock of claim 1, where when the first and second links are in the locked position, the first and second links are in an over center position.

3. The pivot lock of claim 1, wherein when the first and second links are in an unlocked position, the third location is located on a first side of a line intersecting the first and second locations, and wherein when the first and second links are in the locked position, the first location is located on a second side of the line.

4. The pivot lock of claim 1, wherein the linkage assembly is adapted to be pivotally and slidingly coupled to one of the first or second locations.

5. The pivot lock of claim 1, wherein when the first and second links are pivoted from the unlocked position to the locked position, the first link rotates in a first direction and the second link rotates in a second direction opposite the first direction.

6. The pivot lock of claim 5, wherein when the first and second links are in the locked position, the first and second links engage one another to impede the first and second links from rotating further in the first and second directions, respectively.

7. The pivot lock of claim 1, wherein the release mechanism is a lever coupled to the first link at a location on the lever spaced from the distal ends of the lever.

8. The pivot lock of claim 1, wherein the panel is a hood of the vehicle.

9. The pivot lock of claim 1, wherein the release mechanism, when in the release position, engages the linkage assembly between the second and third locations.

10. The pivot lock of claim 1, wherein the release mechanism is coupled to the first link and engages the second link when in the release position.

11. A pivot lock adapted to extend between a vehicle and a panel of the vehicle, the panel reciprocal between an open position and a closed position, wherein the pivot lock is adapted to selectively lock the panel in the open position, the pivot lock comprising:
    (a) a linkage assembly adapted to pivotally couple to the vehicle at a first location and the panel at a second location, the linkage assembly including a first link coupled to a second link at a third location;
    (b) wherein the first link is rotatable in a first direction from an unlocked position, wherein a separation angle between a first line intersecting the first and the third locations and a second line intersecting the second and the third locations exceeds 180 degrees and, to a locked position, wherein the separation angle is less than 180 degrees; and (c) a release mechanism coupled to the linkage assembly, the release mechanism movable into a release position, wherein the release mechanism engages the linkage assembly to rotate the first link in a direction opposite the first direction to remove the first link from the locked position, thereby permitting the panel to reciprocate into the closed position.

12. The pivot lock of claim 11, wherein when the first link is in the locked position, the first link engages the second link to impede the rotation of the first link in the first direction.

13. The pivot lock of claim 11 further including a cam surface disposed on the linkage assembly, wherein when the panel is reciprocated between the open and closed positions, the cam surface engages the release mechanism, selectively moving the release mechanism from the release position to a stowed position.

14. The pivot lock of claim 11, wherein the linkage assembly is adapted to be pivotally and slidingly coupled to either the vehicle or the panel.

15. The pivot lock of claim 11, wherein the release mechanism is coupled to the first link at a location on the release mechanism spaced from the ends of the release mechanism.

16. The pivot lock of claim 11, wherein the panel is a hood of the vehicle.

17. The pivot lock of claim 11, wherein the second link includes a stop that extends outward from the second link, the stop adapted to engage the first link when the first link is in the locked position.

18. The pivot lock of claim 11, wherein the release mechanism is coupled to the first link and engages the second link when in the release position.

19. A pivot lock adapted to extend between a vehicle and a panel of the vehicle, the panel reciprocal between an open position and a closed position, wherein the pivot lock is adapted to selectively lock the panel in the open position, the pivot lock comprising:
(a) a linkage assembly adapted to pivotally couple to the vehicle at a first location and to the panel at a second location, the linkage assembly including a first link pivotally coupled to the second link at a third location;
(b) wherein the first and second links are rotatable relative to one another from an unlocked position, wherein the panel is free to reciprocate to the closed position, to an over center position, wherein the first link engages the second link to impede the panel from reciprocating to the closed position; and
(c) a release mechanism coupled to the first link, the release mechanism adapted to toggle from a stowed position to a release position causing the first and second links to reconfigure from the over center position to the unlocked position, thereby permitting the panel to reciprocate between the closed and open positions, and wherein the release mechanism engages the second link when in the release position.

20. The pivot lock of claim 19 further including a cam surface disposed on the linkage assembly, wherein when the panel is reciprocated between the open and closed positions, the cam surface engages the release mechanism, selectively moving the release mechanism from the release position to a stowed position.

21. The pivot lock of claim 19, wherein the linkage assembly is adapted to be pivotally and slidingly coupled to either the vehicle or the panel.

22. The pivot lock of claim 19, wherein the release mechanism is coupled to the first link at a location on the release mechanism spaced from the ends of the release mechanism.

23. The pivot lock of claim 19, wherein the panel is a hood of the vehicle.

24. The pivot lock of claim 19, wherein the second link includes a stop that extends outward from the second link, the stop adapted to engage the first link when the first link is in the locked position.

25. A pivot lock adapted to extend between a vehicle and a panel of the vehicle, the panel reciprocal between an open position and a closed position, wherein the pivot lock is adapted to selectively lock the panel in the open position, the pivot lock comprising:
(a) a linkage assembly pivotally coupled to a first location on the vehicle and a second location on the panel, the linkage assembly including;
(i) a first link; and
(ii) a second link pivotally coupled to the first link at a third location, the first and second links configurable in a locked position, wherein rotation of the first and second links relative to one another is impeded to restrain the panel from reciprocating to the closed position, and an unlocked position, wherein rotation of the first and second links relative to one another is permitted to allow the panel to reciprocate to the closed position; and
(b) a release mechanism coupled to the linkage assembly, the release mechanism selectively movable to a limit position, wherein the release mechanism engages the first and second links when in the unlocked position to impede the first and second links from rotating to the locked position, wherein the release mechanism is selectively movable to a release position, wherein the release mechanism applies a force to the linkage assembly to rotate the first and second links relative to one another to configure the first and second links from the locked position to the unlocked position.

26. The pivot lock of claim 25, wherein the second link includes a stop that extends outward from the second link, the stop adapted to engage the release mechanism when the release mechanism is in the limit position.

27. The pivot lock of claim 26, wherein the release mechanism is pinched between the stop and the first link when the release mechanism is in the limit position.

28. The pivot lock of claim 25, further comprising a cam surface disposed on the linkage assembly, wherein when the linkage assembly is reciprocated from the locked position to the unlocked position, the cam surface engages the release mechanism, selectively moving the release mechanism into the limit position.

29. The pivot lock of claim 25, wherein when the linkage assembly is in the unlocked position, a separation angle between a first line intersecting the first and the third locations and a second line intersecting the second and the third locations exceeds 180 degrees and, when the linkage assembly is in the locked position, the separation angle is less than 180 degrees.

30. A pivot lock adapted to extend between a vehicle and a panel of the vehicle, the panel reciprocal between an open position and a closed position, wherein the pivot lock is adapted to selectively lock the panel in the open position, the pivot lock comprising:
(a) a linkage assembly pivotally coupled to a first location on the vehicle and a second location on the panel, the linkage assembly including;
(i) a first link; and
(ii) a second link pivotally coupled to the first link at a third location, the first and second links configurable in a locked position, wherein rotation of the first and second links relative to one another is impeded to restrain the panel from reciprocating to the closed position, and an unlocked position, wherein rotation of the first and second links relative to one another is permitted to allow the panel to reciprocate to the closed position; and (b) a release mechanism coupled to the linkage assembly, the release mechanism selectively movable to a limit position, wherein the release mechanism engages the first and second links when in the unlocked position to impede the first and second links from rotating to the locked position; and (c) a cam surface disposed on the linkage assembly, wherein when the linkage assembly is reciprocated from the locked position to the unlocked position, the cam surface engages the release mechanism, selectively moving the release mechanism into the limit position.

31. A pivot lock adapted to extend between a vehicle and a panel of the vehicle, the panel reciprocal between an open position and a closed position, wherein the pivot lock is adapted to selectively lock the panel in the open position, the pivot lock comprising:

(a) a linkage assembly pivotally coupled to a first location on the vehicle and a second location on the panel, the linkage assembly including;

(i) a first link; and (ii) a second link pivotally coupled to the first link at a third location, the first and second links configurable in a locked position, wherein rotation of the first and second links relative to one another is impeded to restrain the panel from reciprocating to the closed position, and an unlocked position, wherein rotation of the first and second links relative to one another is permitted to allow the panel to reciprocate to the closed position; and (b) a release mechanism coupled to the linkage assembly, the release mechanism selectively movable to a limit position, wherein the release mechanism engages the first and second links when in the unlocked position to impede the first and second links from rotating to the locked position, wherein when the linkage assembly is in the unlocked position, a separation angle between a first line intersecting the first and the third locations and a second line intersecting the second and the third locations exceeds 180 degrees and, when the linkage assembly is in the locked position, the separation angle is less than 180 degrees.

* * * * *

UNITED STATES PATENT AND TRADEMARK OFFICE
CERTIFICATE OF CORRECTION

PATENT NO.    : 6,871,716 B2
DATED         : March 29, 2005
INVENTOR(S)   : D.L. Sanderson It is certified that error appears in the above-identified patent and that said Letters Patent is hereby corrected as shown below:

Column 5,
Line 67, "including;" should read -- including: --.

Column 6,
Line 20, "where" should read -- wherein --.
Line 65, "180 degrees and, to" should read -- 180 degrees, and to --.

Column 7,
Line 11, "claim 11" should read -- claim 11, --.
Line 55, "claim 19" should read -- claim 19, --.

Column 8,
Lines 14 and 63, "including;" should read -- including: --.

Column 9,
Line 27, "including;" should read -- including: --.

Signed and Sealed this

Thirtieth Day of August, 2005

JON W. DUDAS
*Director of the United States Patent and Trademark Office*